Oct. 13, 1970   W. V. BOTTS ET AL   3,533,913
RADIOISOTOPE HEAT SOURCE
Filed Feb. 6, 1967
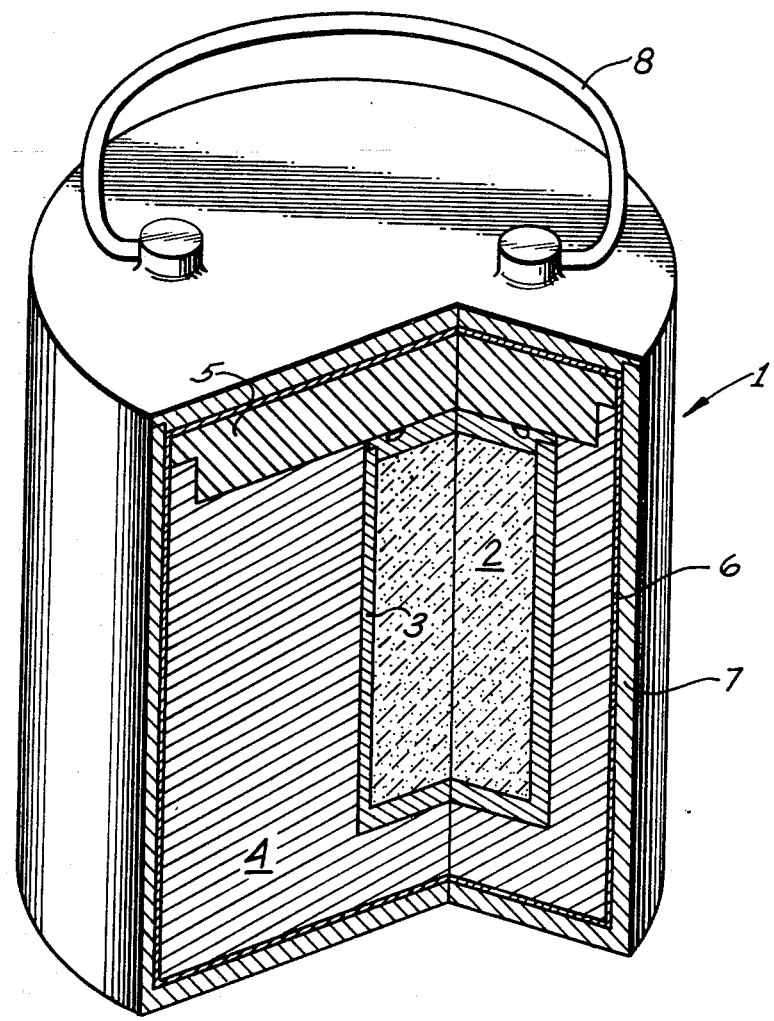
INVENTORS
WILLIAM V. BOTTS
RONALD Y. PARKINSON
BY JOHN S. WILLIAMS
Henry Kolin
ATTORNEY United States Patent Office 3,533,913
Patented Oct. 13, 1970

3,533,913
RADIOISOTOPE HEAT SOURCE
William V. Botts, Encino, Ronald Y. Parkinson, Woodland Hills, and John S. Williams, Santa Susanna, Calif., assignors to North American Rockwell Corporation, a corporation of Delaware
Filed Feb. 6, 1967, Ser. No. 614,355
Int. Cl. G21c 3/06
U.S. Cl. 176—67                                      7 Claims

ABSTRACT OF THE DISCLOSURE

A thermal power radioisotope heat source characterized by low radiation dose rates and by uniquely high power density, reliability, safety, and passivity, which utilizes a low-weight depleted uranium structural radiation shield in combination with selected materials so that the uranium shield may be utilized at elevated temperatures.

Exemplary and preferred is a 5-watt (thermal) heat source having a power density of at least 2 watts/lb. and a power-to-volume ratio of at least 1 watt/cu. in. containing $Pm^{147}_2O_3$ as radioisotopic fuel enclosed in a first capsule of tantalum-tungsten alloy, which is then enclosed in a second capsule of depleted uranium material outwardly wrapped in a tantalum foil, and then enclosed in a third outer capsule of stainless steel.

BACKGROUND OF THE INVENTION

This invention relates to a thermal power radioisotope heat source. It particularly relates to a radioisotope heat source providing thermal power between 1 and 200 watts and having a low radiation level, a high power-to-weight ratio (power density), a high power-to-volume ratio, and operability at elevated temperatures.

Radioisotopic fuels have been used in radioisotope-powered generators for converting the decay heat of the radioisotopic fuel to electricity by means of thermoelectric or thermionic elements. Such generators are of utility in situations where there is need for a remote, unattended, long-lived small power source that is relatively impervious to conditions and hazards of its environment.

Similar needs also exist for a thermal power heat source of between 1 and 200 watts for various space, terrestrial, and under-water applications requiring reliable direct thermal control. At present, such suitable thermal power heat sources utilizing radioisotopic decay heat are not available having high power density, high power-to-volume ratio, and utmost reliability for a wide variety of encounterable environmental conditions. Heretofore, to provide a reliable radioisotope heat source operable at elevated temperatures, relatively heavy radiation shields such as those made of lead, cast iron, tungsten, or tantalum would be required, giving relatively poor power-to-weight and power-to-volume ratios. Attempted use of depleted uranium as a shielding material, which could provide lighter weight at low thermal power levels, presents additional problems because of its chemical reactivity with most usable low-power isotopes as well as its extreme corrosion at but slightly elevated temperatures. Further, the known reactivity of uranium with stainless steel and other high-temperature corrosion-resistant metals that might be used as a cladding for uranium to prevent its high temperature oxidation would present additional problems. Also, any saving in weight obtained by use of uranium for shielding could be offset by structural requirements for an almost indestructible heat source because of stringent safety and extreme environmental requirements.

SUMMARY OF THE INVENTION

It is an object of this invention to provide a thermal power radioisotope heat source having high power-to-weight and power-to-volume ratios and providing uniquely high reliability, safety, and passivity. The thermal power radioisotope heat sources provided by this invention have low radiation dose rates for personnel use and are virtually indestructible in ability to withstand thermal shock temperatures from 2000° F. to liquid nitrogen as well as other extreme potential environmental conditions of operation.

In accordance with the broad aspects of this invention, a thermal power radioisotope heat source providing thermal power from 1 to 200 watts, and preferably from 1 to 50 watts, comprises at least three closed containers in nesting relationship wherein depleted uranium material is utilized as both a shielding material and a structural element in cooperative relationship with a selected radioisotopic fuel. The fuel is enclosed in a first capsule selected from tantalum, tungsten and tantalum-tungsten alloy, which is then enclosed in a second capsule of depleted uranium material, which is then provided with a surrounding barrier layer selected from tantalum, tungsten and tantalum-tungsten alloy, and then sealed in a third capsule of corrosion-resistant high-temperature metal.

The radioisotopic fuel is selected from radioisotopes that are principally alpha- and beta-particle emitters, with minimal gamma-ray emission, so as to thereby minimize shielding-weight requirements while still permitting very high radiation attenuation. The selection of the fuel will otherwise be determined by its half-life, as related to expected length of use, and by the power-level requirements, in part dependent on required surface temperature of the heater. The radioisotope is preferably selected from a promethium-147, thulium-170, plutonium-238, polonium-210, curium-232, or curium-244 source.

By enclosing the fuel in the first capsule, preferably of tantalum-tungsten alloy, reaction between the radioisotopic material and the second capsule of depleted uranium material is prevented. For certain applications it may be desirable to first enclose the radioisotopic fuel in a separate compatible liner prior to insertion in the first capsule.

The depleted uranium material, i.e., material selected from uranium and its high-temperature alloys where the uranium has a smaller percentage of the fissionable isotope of uranium-235 than the 0.7% found in natural uranium, is used as a structural shielding element. Preferred is the depleted uranium-molybdenum alloy, particularly containing about 3 to 5 w/o Mo. The layer about the uranium capsule, preferably of tantalum foil, provides a barrier between the depleted uranium shield and the outer capsule of high-temperature resistant metal, preferably stainless steel. Thereby high-temperature protection of the uranium material, otherwise incompatible with stainless steel, is accomplished.

In its preferred aspects the radioisotope heat source of this invention provides a high power density of at least 2 thermal watts per pound, a high power-to-volume ratio of at least one watt per cubic inch, and capability of sustained reliable operation at elevated temperatures between 1000 and 2000° F.

BRIEF DESCRIPTION OF THE DRAWING

The sole figure of the drawing shows a perspective view, partly in section, of a preferred embodiment of the thermal power radioisotope heat source of this invention.

DESCRIPTION OF THE PREFERRED EMBODIMENTS

Referring to the drawing, which is intended as illustrative and not restrictive of the various structural shapes and configurations which may be made in accordance with the present invention, there is shown a simplified view of a radioisotope heat source 1 from which the principal components may be seen. The selection of the radioactive fuel 2 will ordinarily be made on the basis of the desired thermal power level, power density requirements, permissible radiation dose rate, and mission-life. Preferred low-power radioisotopes, essentially alpha- and beta-emitters, which require relatively light shielding, are promethium-147, thulium-170, plutonium-238, polonium-210, curium-242, and curium-244. Because of the physical and metallurgical requirements for the fuel material, the isotopes with the exception of $Po^{210}$ will ordinarily not be used in the pure elemental form but as their molecular compounds, alloys, or nonstoichiometric mixtures, preferably as their oxides, although nitrides, carbides, silicides and borides of these compounds may also be utilized. For example, $Pu^{238}$ has a melting point ranging from 120° C. to 640° C., depending upon the particular crystalline structure, whereas in the form of PuC its melting point is 1654° C.; $PuO_2$ melts at 2282° C., PuN 2450° C., PuB 2040° C. Polonium-210 is preferably utilized in metallic form, and curium-244 will ordinarily be diluted with thorium. Exemplary and preferred isotopic compounds are $Pm^{147}_2O_3$, $Tm^{170}_2O_3$, $Pu^{238}O_2$, $Po^{210}$, $Cm^{242}_2O_3$, and $Cm^{244}_2O_3$.

A high density radiation shield to prevent the emission of primary and secondary radiation is required for handling of the radioisotope heat source and particularly where the heater is to be subsequently used in contact with personnel. Since the radiation shield generally constitutes most of the total weight of the radioisotope heater, the selection of a shield which provides high strength and minimal weight for a given radiation flux is highly desirable for achieving a high power-to-weight ratio. Exemplary of known shielding materials are lead, cast iron, tantalum, tungsten, and depleted uranium. Ordinarily, for the combined requirements of radiation shielding, high temperature use, and structural rigidity, a shield of tantalum or tungsten would be selected. While depleted uranium would provide a saving in shield weight for a low-power radioactive source, its use has heretofore not been considered feasible, because of its lower structural strength, and particularly because of its lack of compatibility with the isotopic fuel, its rapid corrosion when exposed to elevated temperatures, and its reactivity with high-temperature oxidation-resistant cladding materials such as the stainless steels and the refractory nonferrous metals and nickel-base alloys.

However, it has now been found that if the radioisotopic fuel 2 is enclosed in a first capsule 3 made of tantalum, tungsten, or tantalum-tungsten alloy, preferably tantalum-tungsten alloy and particularly containing between 8 and 11 weight percent (w/o) tungsten, full compatibility can be obtained with a uranium shield. At the same time this first capsule will withstand an inner temperature as high as 3000° F. for at least an hour. Particularly preferred for the capsule material is a commercially available Ta-10 w/o W alloy. For still higher temperature use, hafnium may be added to the alloy. Illustrative of such hafnium-containing higher temperature suitable alloys are Ta-8.6 w/o W-1.4 w/o Hf and Ta-9.4 w/o W-2.6 w/o Hf. While the use of Navy brass or other refractory metals such as niobium and rhenium for capsule 3 would afford some corrosion protection, they are less desirable for giving the extremely high temperature corrosion protection such as obtainable with tantalum, tungsten, and tantalum-tungsten alloy, preferably the binary alloy.

The second capsule 4 and its cover 5, serving as structural radiation shield, constitute most of the weight of the radioisotope heater. By selecting the shield material from depleted uranium and its alloys, particularly uranium-molybdenum alloys, a substantial saving in both the weight and volume of the shield is obtained compared with other potential shielding materials, such as tungsten, tantalum, cast iron, or lead, which would weigh at least twice as much as the depleted uranium shield and increase the overall volume by about 50%. The use of depleted uranium alloy containing 3–5 w/o molybdenum is preferred, particularly U-3 w/o Mo, since this material provides essentially the same radiation shielding as depleted uranium, is easier to machine, is somewhat more oxidation resistant, and provides twice the structural strength of uranium. The thickness of the shield will, of course, be determined by the isotopic fuel characteristics, the relative thermal power level, the desired radiation dose rate, and other operational constraints.

At temperatures above 400° F., and particularly above 800° F., uranium is rapidly oxidized. Attempts to directly protect uranium with a cladding of a metal or alloy that is oxidation resistant at elevated temperatures such as the stainless steels (nominally Fe-18 w/o Cr-8 w/o Ni) and the refractory alloys (essentially nickel-base alloys such as the Ni-Cr superalloys) have been unsuccessful at high temperatures because of the reaction of uranium when in direct contact with these materials forming lower melting eutectic alloys.

However, by providing a layer 6 selected from tantalum, tungsten, and tantalum-tungsten alloy about the uranium capsule, preferably as a wrapped-around foil up to 5 mills thick, the uranium is thereby rendered compatible with the high-temperature oxidation-resistant cladding materials. It is particularly preferred that layer 6, which serves as an inert high-temperature barrier material between the uranium shield and the protective cladding, be made of tantalum foil, in perference to other potential barrier materials, such as niobium, rhenium, or ceramic glasses, because of the ready forming of the tantalum foil and the superior results obtained with its use. While layer 6 could be in the form of a sealed capsule, this would unduly add to the overall weight and would lack the ease of forming obtained by use of tantalum foil.

A third capsule 7 is used to contain the foil-wrapped depleted uranium capsule. This outer capsule 7 is preferably made of stainless steel, rather than of the high-temperature oxidation-resistant nickel-base alloys, e.g., the Hastelloys and superalloys, because of the lower cost of stainless steel, its ease of machining, and ease in forming a leak-tight welded seal. Exemplary and preferred is the commercially available AISI 304 austenitic stainless steel.

For certain personnel applications, e.g., for carrying the heater in a back-pack or for use in a deep-sea diving suit, it may be desirable to position fuel 2 asymmetrically in relation to surrounding shield 4, i.e., to provide an eccentric geometry as shown in the figure, so that the heater may be positioned to provide more shielding in the direction of personnel contact. Thereby the overall shield weight may be further reduced. Conveniently, a handle 8 may be attached to the outer capsule for convenience in handling and carrying.

EXAMPLE

In accordance with the principles of this invention, a 5-watt heat source providing a surface temperature in air of approximately 200° F. was built having an overall weight of 1.95 lbs. and a volume of 2.65 cu. in. (1.5 in. diameter and 1.5 in height). This heat source therefore provides a power density of 257 watts/lb. and a power-to-volume ratio of 1.9 watts/cu. in. The fuel was prepared by cold pressing and sintering 18.5 g. promethium-147 oxide ($Pm^{147}_2O_3$) at 3000° F. for 2 hours to provide a fuel with a density greater than 85% of theoretical and having a very hard smooth surface. The fuel source, M.P. 2270° C., contained 14 kilocuries of from 42-day $Pm^{148}$ to negligible proportions, $Pm^{146}$ in the fuel being only 0.25 part per million on a curie basis. The fuel was then contained in a 30-mil thick first capsule of tantalum-10 w/o tungsten alloy, to which a closure cap of Ta-10 w/o W was welded in a helium atmosphere to give a gas-tight seal. This first capsule was then eccentrically located in a second capsule of depleted uranium- 3 w/o molybdenum alloy weighing 1.8 lbs. The U-3 w/o Mo cap of this second capsule was welded in position in vacuum, and the seal was checked for leakage with helium gas and a helium mass spectrometer. The preferential shielding in one direction provided a very low radiation dose rate of less than 2 mr./hr. at a distance of 6 in. The second capsule was then completely wrapped about with a 2-mil thick tantalum foil, which provided compatibility at elevated temperatures between the second and third capsules. The outer capsule consisted of 304 stainless steel having 30-mil walls and 60-mil end caps to provide effective high-temperature oxidation protection for the depleted uranium alloy shield. This outer capsule was sealed tight by electron beam welding. An operational handling ring was attached to a lip on the top surface of the heater. The foregoing 5-watt heat source was found to successfully meet the following severe tests simulating extreme environmental operation conditions:

Maximum temperature—2000° F. for 1 hr.
Thermal shock—From 2000° F. to room temperature by dousing with water
External pressure—3000 p.s.i.g.
Puncture resistance—30 ft.-lb. impact onto ⅛-in. diameter rounded end pin with Rockwell C hardness in excess of 45
Crush force—23,000 lbs.
Shear force—10,000 lbs.
Vibration—0.5 in. double amplitude at 20–35 c.p.s.; 30×G at 35–2000 c.p.s.

The extra safety of the heat source is attained by its relative indestructibility under credible conditions, in combination with the required shielding for given radiation levels. The heat sources of course completely passive in that it may be unattended, and also no switches, controls, or monitoring devices are required. Because of the absolute reliability of the heat source, otherwise-required redundant circuitry can be eliminated.

It will, of course, be understood that while various materials and components have been uniquely combined so as to utilize a depleted uranium structural shield to provide a thermal power radioisotope heat source having high power density and power-to-volume ratio, as well as being substantially indestructible, safe, and passive, it is of course feasible to substitute or variously modify any one of the specific materials or components utilized. However, this can only serve to degrade or dilute one or more of the desirable parameters characterizing the thermal power heat source of this invention, resulting in a radioisotope heater having poorer corrosion resistance or lower power density or loss or deterioration of some other desired property. Furthermore, the themal heat source may be made in various shapes and geometries utilizing both symmetrical and asymmetrical shielding, depending upon the desired application. Since heat transfer from a heat source to a component requiring heat will norminally be by direct conduction, the heat source may be readily shaped as necessary to match the contour of a particular component. Also, in accordance with the principles of this invention, a high power density radioisotope heater may be readily constructed for any desired thermal power application requiring between 1 and 200 thermal watts, and preferably between 1 and 50 watts.

It will thus be apparent that many variations in details of construction of the thermal power radioisotope heat source and in selection of specific radioisotopes and selection and modification of materials may be practiced without departing from the scope of the present invention which enables the utilization of a low-weight depleted uranium shield together with other selected materials to provide a unique thermal power heat source of superior properties and utilizable at elevated temperatures. Thus, while the principle and preferred embodiments of the radioisotope heater of the present invention have been illustrated and described, it should be understood that within the scope of the appended claims the invention may be practiced otherwise than as specifically illustrated and described.

We claim:

1. A thermal power radioisotope heat source having a high power density and capable of sustained reliable operation in a high temperature environment, comprising three closed containers in nesting relationship wherein depleted uranium material is utilized as structural radiation shield in cooperative relationship with a radioisotopic fuel which is essentially an alpha- or beta-particle emitter, wherein the radioisotopic fuel is enclosed in a first container selected from tantalum, tungsten and tantalum-tungsten alloy, said first container is enclosed in a second container made of depleted uranium material, and said second container is enclosed in a third container selected from the class of high-temperature oxidation-resistant stainless steels and nickel-base alloys ordinarily reactive with uranium material at elevated temperatures, a barrier layer selected from tantalum, tungsten and tantalum-tungsten alloy being interposed between said second and third containers to prevent reaction therebetween.

2. A heat source according to claim 1 wherein the radioisotope of the radioisotopic fuel is selected from $Pm^{147}$, $Tm^{170}$, $Pu^{238}$, $Po^{210}$, $Cm^{242}$, and $Cm^{244}$.

3. A heat source according to claim 2 wherein said first container is made of a tantalum-tungsten alloy containing 8–10 w/o tungsten.

4. A heat source according to claim 2 wherein said second container is made of depleted uranium-molybdenum alloy containing 3–5 w/o molybdenum.

5. A heat source according to claim 2 wherein said barrier layer is made of tantalum foil.

6. A heat source according to claim 2 wherein said third container is made of stainless steel.

7. A 5-watt radioisotope heat source having a power density of at least 2 watts/lb., a power-to-volume ratio of at least 1 watt/cu. in., and a very low radiation dose rate and capable of sustained reliable operation in a high temperature environment, which comprises, in combination, $Pm^{147}_2O_3$ as radioisotopic fuel, a sealed first capsule of tantalum-10 w/o tungsten alloy containing said fuel, a sealed second capsule of uranium-3 w/o molybdenum alloy serving as structural radiation shield and containing said first capsule, a foil of tantalum enclosing said second capsule, and a sealed third capsule of stainless steel containing the enclosed second capsule.

References Cited

UNITED STATES PATENTS

| | | | |
|---|---|---|---|
| 2,863,816 | 12/1958 | Stacy | 176—82 X |
| 2,894,320 | 7/1959 | Gurinsky et al. | 176—82 |
| 3,262,858 | 7/1966 | Gittus | 176—67 X |
| 3,291,700 | 12/1966 | Brossa et al. | 176—82 |
| 3,330,974 | 7/1967 | Wilson | 176—91 |
| 3,331,748 | 7/1967 | Feraday | 176—67 X |

BENJAMIN R. PADGETT, Primary Examiner

M. J. SCOLNICK, Assistant Examiner

PO-1050
(5/69)

UNITED STATES PATENT OFFICE
CERTIFICATE OF CORRECTION

Patent No. 3,533,913            Dated October 13, 1970

Inventor(s) W. V. Botts et al

It is certified that error appears in the above-identified patent and that said Letters Patent are hereby corrected as shown below:

Column 2, line 37, "curium-232" should read --curium-242--

Column 4, line 69 should read --$Pm^{147}$. The fuel was aged to reduce gamma radiation from 42-day $Pm^{148}$ to negligible proportions, $Pm^{146}$ in--

SIGNED AND SEALED
DEC 22 1970

(SEAL)
Attest:

Edward M. Fletcher, Jr.
Attesting Officer

WILLIAM E. SCHUYLER, JR.
Commissioner of Patents